Feb. 23, 1932. F. R. KLAUS 1,846,117
RIM
Filed June 14, 1926 3 Sheets-Sheet 1
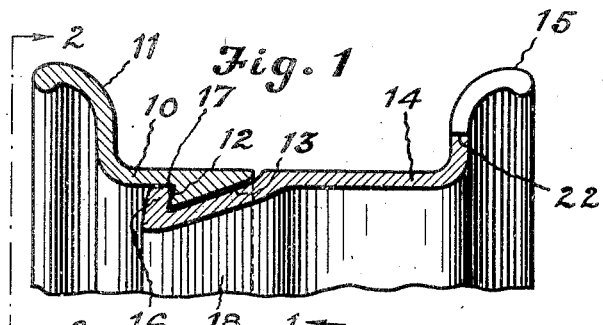
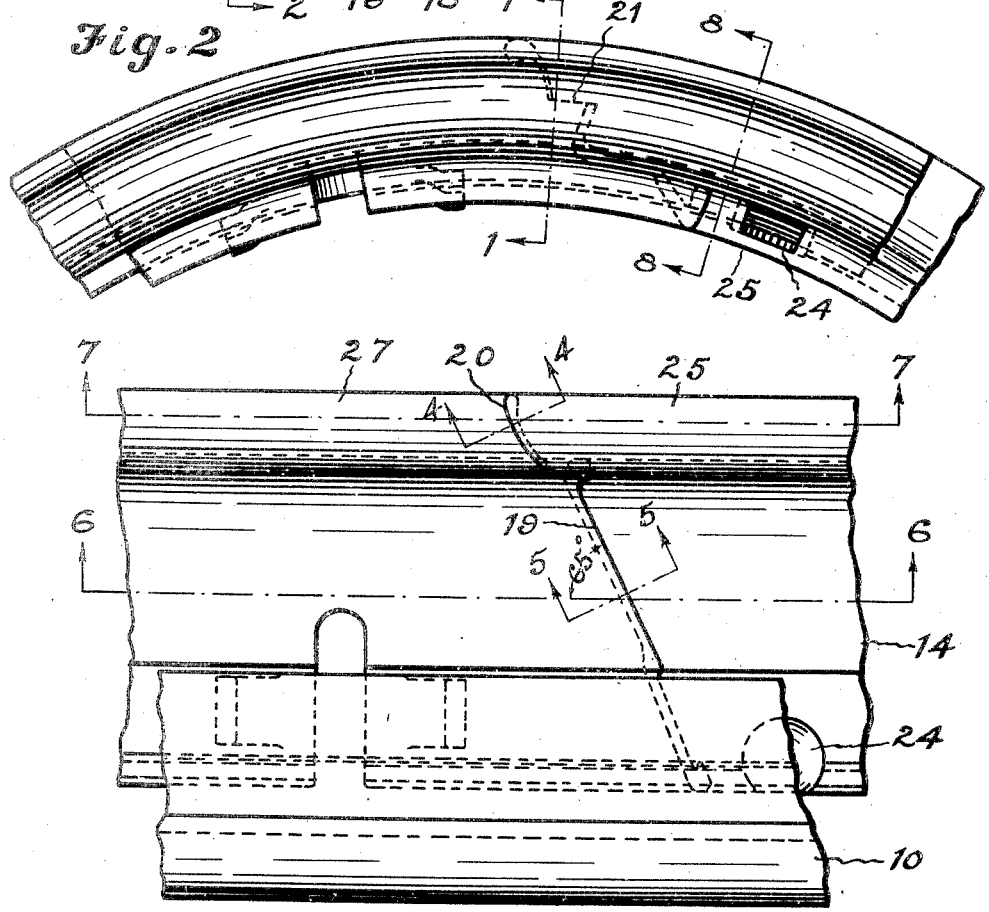
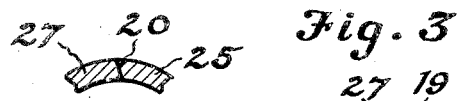
INVENTOR
Fred R. Klaus
BY Evans & McCoy.
ATTORNEY INVENTOR
Fred R. Klaus
BY Evans & McCoy
ATTORNEY Patented Feb. 23, 1932

1,846,117

UNITED STATES PATENT OFFICE

FRED R. KLAUS, OF WARREN, OHIO, ASSIGNOR, BY MESNE ASSIGNMENTS, TO THE GOODYEAR TIRE & RUBBER COMPANY, OF AKRON, OHIO, A CORPORATION OF OHIO

RIM

Application filed June 14, 1926. Serial No. 115,838.

This invention relates to transversely split tire carrying rim structures of the demountable type and particularly to rim structures embodying a transversely split base portion adapted to interlock with an endless side member.

One of the objects of this invention is to provide a rim structure embodying an endless rim element and a transplit rim element having one side of the split protected from blows in every direction by the endless rim member and the wheel felloe and also having the opposite edge portion of the transplit rim member interlocked and mutually protected against blows from radial and lateral directions in the zone of the split, the abutting ends of the transplit rim element being laterally aligned by the cooperative action of the endless rim element to provide a very rigid and strong demountable rim structure of relatively light weight.

Another object of the invention is to provide a transverse split, in a rim of the character designated, that is of such form as to cause the abutting end portions of the split rim element to interlock against relative radial and lateral movement and that will also insure alignment of the end portions at all times while the rim is in assembled condition, regardless of distortions of the rim, without the use of supplemental fastening means, such as the conventional form of securing plates now customarily used on certain rims of large size.

Another object of this invention is to provide a rigid structure of the character designated which may be very readily assembled and disassembled and that is particularly adaptable to rims of relatively small radius and large transverse dimension, such, for instance, as those customarily used at the present time for pneumatic tires of the so-called balloon type.

An additional object of this invention is to provide a transplit rim structure that may be very easily and quickly disassembled, that is substantially fool proof, that is positively interlocked against unintentional disassembly, and that is so arranged that it will automatically assemble itself if left in a partially assembled condition when mounted on a vehicle wheel and a tire mounted thereon is fully inflated.

Another object of this invention is to form the endless rim element of a rim structure of the character proposed, with an inclined inner face that cooperates with the gutter wall of the rim to materially assist in the assembly of the rim structure, the inclined face constituting a conical wedge adapted to assist in decreasing the size of the transplit member a sufficient degree to facilitate the interlocking of the rim parts.

Other objects of the invention and advantages to be obtained from using the invention, will be apparent to those skilled in the art from a consideration of this specification and the appended drawings wherein:

Figure 1 is a transverse sectional view of a rim assembly embodying this invention and taken substantially on line 1—1 of Fig. 2 of the drawings;

Fig. 2 is a lateral side view of the assembly rim structure shown in Fig. 1, looking in the direction of the arrows 2—2;

Fig. 3 is a plan face view of the face of the rim assembly, with parts broken away, showing the transverse split in the rim as it appears when the rim is in assembled condition;

Fig. 4 is a fragmentary sectional view, taken substantially on line 4—4 of Fig. 3 and looking in the direction of the arrows, of a portion of the transverse split formed in the side flange of the rim and illustrating a preferred angularity of the transverse cut at this point relative to the face of the rim flange;

Fig. 5 is a fragmentary sectional view of the transversely split rim member, taken substantially on line 5—5 of Fig. 3, showing the angularity of the transverse cut to the face of the rim;

Figure 6:
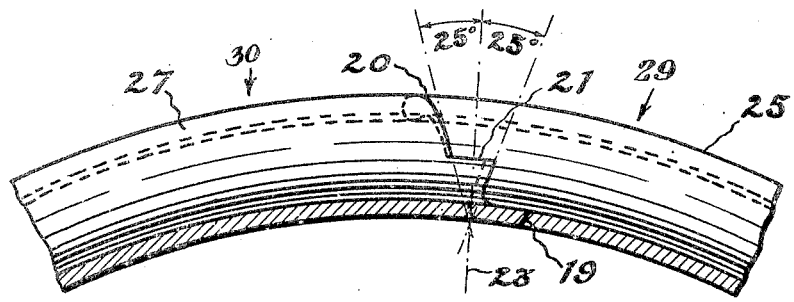
Fig. 6 is a sectional view of the transplit rim member, taken substantially on line 6—6 of Fig. 3, looking in the direction of the arrows.
Figure 7:
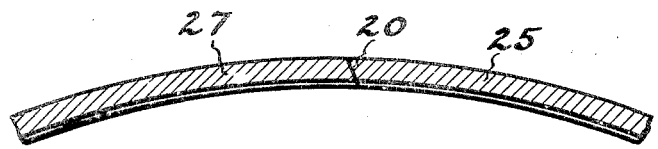
Fig. 7 is a fragmentary circumferential sectional view of the top of the side flange of the transversely split rim element, taken substantially on line 7—7 of Fig. 3 and illustrating the angularity of the transverse cut at this point relative to the circumferential curvature of the rim.

A rim constructed in accordance with this invention embodies an endless rim member 10 that has a tire retaining flange 11 formed along one edge portion and a radially inwardly extending annular shoulder 12 formed along the other edge portion, the inner face 13 of the shoulder being of frusto conical form.

The endless rim member 10 interlocks with a transplit rim member 14 to provide a complete rim assembly. The transplit rim member 14 has an annular tire retaining flange 15 formed along one edge portion thereof and, along the other edge portion, has a gutter, the outer wall 16 of which has an inclined inner face and a peripheral seating face 17 that is adapted to engage the inner side of the endless rim member 10. The gutter of the transplit rim member is adapted to receive the inwardly extending annular shoulder 12 of the endless member 10 to positively interlock the rim members in their assembled relation. A frusto conical seating face for the rim assembly is formed on the radially inner face 18 of the transplit rim member 14. A rim of this general construction but having a transverse split of different character and a different form of endless rim element is shown and claimed in my Patent No. 1,590,762, issued June 29, 1926.

The feature of novelty that constitutes the principal subject matter of the claims of this application, is the particular character of the transverse split that is formed in the base member 14, and the cooperating relation of the endless rim member and the transplit rim member when the transverse split is of the character described.

The transverse split of the rim member 14 comprises three distinct portions, one of which is referred to as 19, and extends through and diagonally across the base of the rim member to a position substantially widway of the tire retaining flange 15. This portion of the split is formed at an angle to the radius lines of the rim drawn to the edges of the split and is also arranged to extend diagonally across the rim. A second portion 20 of the split extends inwardly from the outer edge of the flange 15 to substantially the same level as the termination of the portion 19 of the split. The portion 20 of the split extends in the same general diagonal direction as the portion 19, although in an oppositely inclined radial direction, the radial angularity preferably being about the same for the portions 19 and 20 of the split. These two elements of the split are joined by a third circumferentially extending portion 21 that provides a circumferential shoulder or seat 22 that is preferably positioned within the side wall of the flange 15.

The preferred angularity of the different portions of the split is defined by relating the plane of the split to the median line of the face of the rim assembly and to an arbitrarily selected radius line extended to some portion of the split. The degree of angularity may vary over a wide range depending upon the particular character of rim with which it is intended to be used. The angularities given are preferred for a 32 x 6 passenger car tire.

The portion 19 of the split that lies in the tire seating face of the rim is preferably formed in a plane that is inclined at an angle of about 25° relative to a reference radius line 23 of the wheel that extends to one edge of the split as shown in Fig. 6. The split extends diagonally across the face of the rim at an angle of about 65° with reference to the median line of the rim face as shown in Fig. 3. This provides a portion 19 of the split that is radially inclined and that also extends diagonally across the face of the rim. The radial inclination of the portion 19 of the split is intended to facilitate the relative inward movement of one edge portion of one of the abutting end portions of the transplit rim member 14 during disassembly of the rim and to interlock the abutting rim ends against relative radial movement in one direction. The angularity of the split in the rim relative to the chosen reference radius of the rim and also relative to the median line of the rim face is determinated by the conditions most suitable for the particular type and size of rim to which the invention is applied, typical radial and diagonal inclinations being given merely as illustrative of suitable angular differences between the direction of the particular portion of the transverse split and the median plane of the rim and a reference radius of the rim drawn to one edge of the cut.

Figure 8:
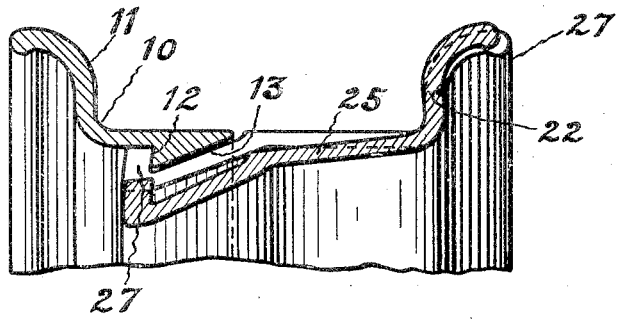
Fig. 8 is a transverse sectional view of the rim assembly taken substantially on line 8—8 of Fig. 2, showing the rim in partial disassembled condition, one portion of the rim being sprung inwardly preparatory to disassembling the rim structure.
Figure 10:
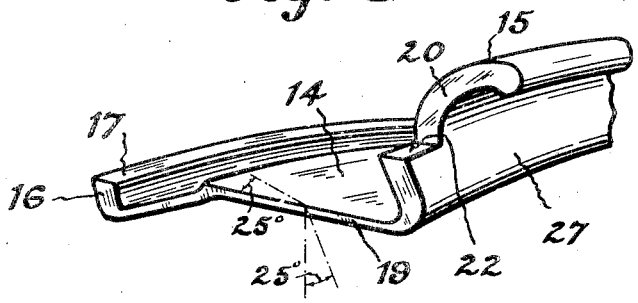
Fig. 10 is an end view, shown in perspective, of one of the abutting ends of the transversely split rim element, the remainder of the rim assembly being removed or broken away.

The portion 20 of the split extends in the same general transverse direction as regards angularity with respect to the median line of the rim face as does the portion 19 of the transverse split. The general direction of the plane forming the transverse split 20 in the outer edge portion of the rim flange 15 preferably is somewhat less, in certain rim sizes, than the angularity of the portion 19 of the split with respect to the median line of the rim face in order to facilitate disassembly of the rim. The angularity between these two portions of the cut is so chosen as to provide a rim in which one of the abutting ends may be most readily sprung inwardly about the circumferential shoulder 22 and moved laterally the thickness of the wall of the flange 15 without having any binding between the abutting portions defining the split 20. This position of the rim parts is shown in Fig. 8. The difference in angularity of these elements of the split may vary over a wide range with due regard for the strength of the interlocking portions of the rim flange.

The portion 21 of the split is formed in the flange 15 and preferably extends circumferentially of the rim in a plane parallel with the axis of the rim. The elements of the split thus formed of primary importance are the provision of an interlocking connection between the abutting portions of the side flange 15, the provision of a circumferential seat 22 in the rim flange and the transverse angularity of sufficient degree to facilitate assembly and disassembly of the rim parts. Having thus described the general form of transverse split in the rim, the method of manufacture of the rim will next be described. After the separate rim parts 10 and 14 are formed and sized, the rim part 14 is then transversely split by sawing transversely through the base portion of the rim member at the desired angularity chosen for the particular type of rim being manufactured, the cut extending completely through the base portion of the member 14 and only partially through the side flange 15. A second cut is then formed in the side flange 15 at the desired angle and spaced the desired distance from the termination of the first cut. The rim member is then placed in a shearing machine and the metal connecting the terminations of the two saw cuts thus formed is sheared to provide the circumferential portion 21 of the split. This operation completely severs the rim 14 and provides a split of the desired character. Although this method of manufacture is preferred, any other suitable method of manufacture of a rim of this character could be satisfactorily used.

Figure 9:
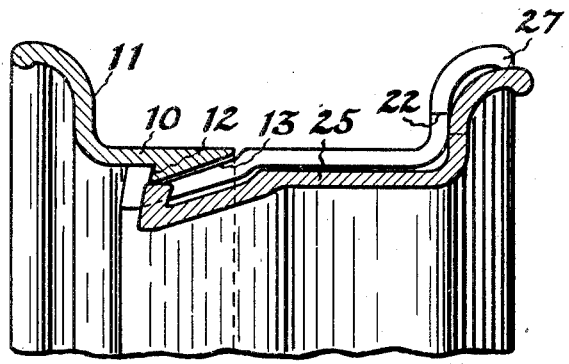
Fig. 9 is a transverse sectional view of the rim, corresponding to Fig. 8, with one end of the split rim moved radially inwardly and laterally with respect to its assembled condition.

The disassembly of the rim structure is quickly and conveniently performed by inserting any suitable tool within the tool recess 24 and prying the gutter edge of the end portion 25 radially inward a sufficient degree to clear the annular interlocking shoulder 12, and laterally a sufficient degree to unseat the end portion 25 from the circumferential shoulder 22. When the edge of the rim end 25 is pried radially inward, it pivots on the circumferential shoulder 22, as shown in Fig. 8. The lateral movement of the rim end unseats the rim flange from the shoulder 22. The rim parts then take the position shown in Fig. 9. Since rims of this character are generally formed of mild steel, the inherent resiliency of the rim member 14 permits considerable distortion of the rim without imparting a permanent strain to the metal and without exerting great force.

Movement of the rim laterally slightly more than the lateral thickness of the flange 15 causes the outer edge of the end 25 of the transplit member to disengage the shoulder 22 and spring radially inwardly, thereby preventing the unintentional return of the end portion 25 to its seated position. This enables the operator to obtain a new purchase with the operating tool and to quickly completely disassemble the rim structure. This feature of the rim insures a very quick and convenient disassembly of the rim parts.

Figure 11:
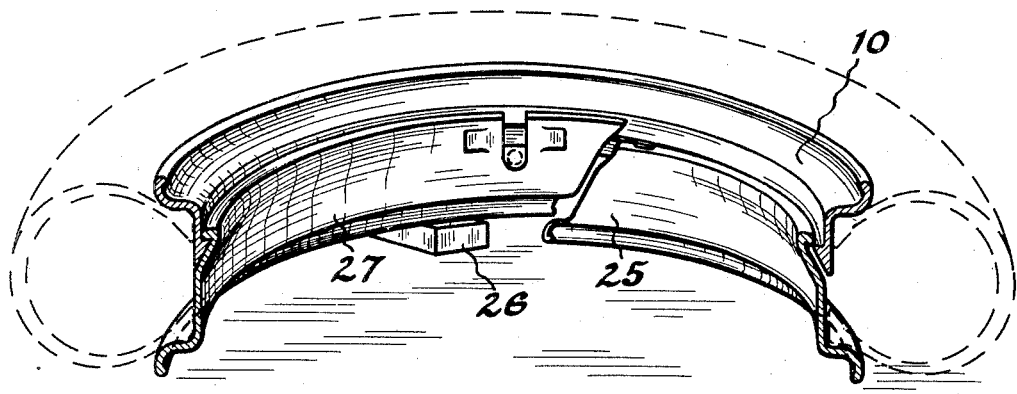
Fig. 11 is a side elevational view of the rim parts illustrating a method of assembling the structure.

In the assembly of the rim parts, one method is to place the transplit rim member 14 flat on the floor with a block 26 inserted under the end portion 27, as shown in Fig. 11. The tire is placed on the transplit member and the endless rim member 10 is hooked over the gutter wall of the raised end portion 27 of the transplit base member with the annular shoulder 12 of the endless member partially interlocked with the gutter of the transplit member. Pressure is then applied to the opposite side of the endless member. The conical or wedge shaped face 13 of the endless member, being of somewhat greater radius at its inner edge than the radius of the face of the gutter wall, assists in the operation of assembling the endless member over the transplit member, thus causing progressively more and more of the annular shoulder 12 to be received within the interlocking gutter of the transplit member. After the endless member is thus forced into place over a large portion of the gutter wall of the transplit member, the block 26 is removed and pressure is applied to the remaining unseated portion of the endless member and to an opposite point of the transplit member. The final seating of the end 25 of the transplit member is produced by kicking the rim flange radially outward and downward at the same time to move the end portion 25 over the shoulder 22 of the flange. It will be found that when the rim is forced together in this manner, the parts very readily assemble themselves without the need of a very great degree of force even when the rim is of relatively large size.

The rim parts may also be assembled by first placing the endless ring 10 on the floor, mounting the tire on the ring 10, then hooking the outer gutter wall of the end portion 27 over the annular flange 12 of the endless ring and pressing the transplit member down against the wedging face 13 of the endless member to progressively interlock more and more of the gutter wall with the annular shoulder 12. The end portion 25 of the rim is the last to be interlocked in place and this is done by delivering a blow radially outward and downward to the edge of the end 25 which springs the end portion 25 over the circumferential shoulder 22 and completes the assembly of the rim structure.

If the rim becomes distorted in use or is left in a partially assembled condition by one unfamiliar with rims of this character, the pressure of air in the tire and the expansive action of the cone shaped face of the felloe automatically cause the rim parts to seat themselves properly, thus overcoming the dangers formerly arising from deformed transplit rims and from carelessness in assembling rim structures of the previously proposed types. It will therefore be seen that the rim elements tend to automatically adjust themselves because of the particular angularity of the transverse cut, the shoulder 22 and the relation of the inclined gutter wall to the inwardly extending tire flange.

A rim of this character has many additional advantages over previously proposed rim structures. The rim is of very light weight and yet very substantial. The positive interlocking of the abutting ends of the transplit rim member against both radial and lateral displacement without the need of a supplemental locking device is of material importance. The abutting ends of the transplit rim member are also positively locked against unintentional disassembly. The transplit member can only be released from the endless member by twisting one end about the seating shoulder formed in the opposite flange. Such twisting operation can never result from an excessive blow or other abnormal strains because of the protection afforded on one side by the endless member 10 and on the other side by the shoulder 22.

The shoulder 22 also greatly facilitates disassembly of the rim by so interlocking the partially disassembled rim parts as to enable the operator to get a new purchase with the tool being used to disassemble the rim, at a critical point in the disassembly operation without having the rim structure reassemble itself after its disassembly is well started. The only tool necessary in the handling of a rim structure of this character is a screw driver or other convenient tool that can be used to pry one edge portion of the rim radially inwardly a sufficient degree to clear the shoulder 12 of the endless member. A very small force will generally suffice.

The rigidity of the rim in the zone of the split is of particular importance. The shoulder 22 resists any blows imposed on the end portion 25, such, for instance, as the blow in the direction of the arrow 29 shown in Fig. 6. The radial inclination of the portion 19 of the split serves to resist radial blows in the direction of the arrow 30. Any lateral misalignment of the abutting ends of the transplit member is prevented by the interlocking of the gutter wall with the annular flange 12. This cooperative relation of the rim elements provides a rim structure of great rigidity.

It will be obvious to those skilled in the art that various modifications in the particular angularity and the relation of the parts of the transverse split and of the inclination and height of the gutter wall may be made without departing from the spirit of the invention. I desire, therefore, that this invention be limited only by the prior art relating to rims of this general character.

What I claim is:

1. A transversely split rim member having one portion of the split extending diagonally across the rim member and arranged at an angle to a radius line extending to said portion of the split, a second portion of the split extending through a portion of the tire-retaining flange, the angularity of the second portion of the split with respect to the reference radius line being only slightly less in magnitude but in an opposite direction from the angularity of the first-mentioned portion with respect to said reference radius, and a third portion of the split extending circumferentially through the sidewall of the tire-retaining flange of the rim member to provide a circumferential seating face within the sidewall of the tire-retaining flange, the circumferential seating face extending from one end of the first portion of the split to the end of the second portion.

2. A transversely split rim member having one portion of the split extending diagonally across the rim member and arranged at an angle to a radius line extending to the split, a second portion of the split extending through a portion of the tire-retaining flange and arranged in the same general diagonal direction as the first portion of the split, the angularity of the second portion of the split with respect to the reference radius line being only slightly less in magnitude but in an opposite direction from the angularity of the first-mentioned portion with respect to said reference radius, and a third portion of the split extending circumferentially through the sidewall of the tire-retaining flange of the rim member to provide a circumferential seating face within the sidewall of the tire-retaining flange, the circumferential seating face extending from one end of the first portion of the split to one end of the second portion.

3. A transversely split rim member having its split diagonally arranged, one portion of the split extending in opposed angularity to the angularity of the other portion of the split with respect to a reference radius line of the rim and both portions of the split being of substantially the same diagonal angularity across the face of the rim, and a portion of the split located entirely in the side flange of said rim member connecting the inner extremities of the first-named portions to provide a circumferential shoulder within the side flange of the rim.

4. A rim assembly comprising a transversely split rim member having a tire-retaining flange along one edge portion, an endless rim member seated on the peripheral face of the transversely split member and having interengagement to secure the said members against lateral movement in respect to each other, the transversely split rim member having a diagonally arranged split, one portion of which is arranged in a plane at an angle to a second portion thereof with reference to a radius line of the rim extending to the split, and spaced from said second portion, and a third portion of the split connecting the juxtaposed ends of the first and second portions of the split and arranged in the tire-engaging flange substantially in a plane disposed at an angle to the planes in which the first and second portions of the split are formed.

5. A tire-receiving rim assembly comprising an endless rim member and a transversely split rim member, said endless rim member having interengagement therewith to secure said members against lateral movement in respect to each other, said split having a portion extending diagonally across the face of the rim and terminating in a tire-retaining flange formed along the outer edge thereof, a second diagonal portion spaced circumferentially from the termination of the first portion and extending from an intermediate point in the flange through the outer edge thereof, and a third portion joining the adjacent extremities of the first and second portions to provide a circumferential shoulder intermediate the extremities of the first two portions.

6. A tire-receiving rim structure comprising an endless side ring, and a transversely split member, said members being formed with interlocking means to removably maintain said rim structure in assembled condition, a tire-retaining flange of the split member being provided at one end with a circumferentially extending portion and at the other end with a shoulder underlying the circumferentially extending portion that serves as a fulcrum about which the severed rim end is twisted in disassembling the rim parts.

7. A tire-receiving rim structure comprising an endless side ring, and a transversely split base member having an outer flanged portion said members being formed with interlocking means to removably maintain said rim structure in assembled condition, said split base rim member being provided in its outer flanged portion with an interlocking tongue and groove connection whereby the abutting ends of the member mutually support each other against radial blows imposed thereon.

8. A tire-receiving rim structure comprising an endless side ring, and a transversely split base member having means for maintaining the side ring thereon, said split member having a stepped cut formed in a tire-retaining flange, portions of which interlock to resist relative radial movement of each end of the side flange of the split member.

9. A transversely split rim member having one portion of the split extending diagonally across the face of the rim and terminating in a tire-retaining flange formed along the outer edge thereof, a second portion of the split being spaced circumferentially from the termination of the first portion and extending from an intermediate point in the flange through the outer edge thereof, and a third portion of the split joining the extremities of the first and second portions to provide a circumferential shoulder intermediate the extremities of the first two portions.

10. A transversely split rim member having a tire-retaining flange provided at one end with a substantially circumferentially extending portion and at the other end with a shoulder underlying the circumferentially extending portion that serves as a fulcrum about which the ends of the rim member may be twisted in removing a tire therefrom 11. A rim comprising an endless rim member, a transversely split member having a base portion, a tire-engaging flange at one edge of the base portion, and means adjacent its other edge for removably securing the endless member on the base member, the split in the split member, including a laterally directed portion in the base portion thereof, a laterally directed portion in the tire-engaging flange spaced from the terminus of the split in the base, and a substantially circumferentially directed portion in the tire-engaging flange connecting adjacent termini of the first-mentioned portions of the split.

12. A rim comprising an endless rim member, a transversely split member having a base portion, a tire-engaging flange at one edge of the base portion, and means adjacent its other edge for securing the endless member thereon against lateral movement, the split in the split member comprising a laterally directed portion in the base thereof, a laterally directed portion in the tire-engaging flange spaced from the terminus of the split in the base, and a substantially circumferentially directed portion in the tire-engaging flange connecting adjacent termini of the first-mentioned portions of the split, the split in the base of the cylindrical member being directed at an angle to a radius of the rim extending to the split, and a portion of the split in the tire-engaging flange also being directed at an angle to a radius of the rim extending to the split.

13. A rim comprising an endless rim member, and a transversely split member, said members having portions securing them removably together, the split in the split member comprising a laterally directed portion in the base, a laterally directed portion in a tire-engaging flange spaced from the terminus of the split in the base, and a substantially circumferentially directed portion in the tire-engaging flange which connects adjacent termini of the first-mentioned portions of the split, the split in the base of the split member being directed at an angle to a radius of the rim extending to the split.

In testimony whereof I affix my signature.

FRED R. KLAUS.